United States Patent
Goh

(10) Patent No.: US 7,865,632 B2
(45) Date of Patent: Jan. 4, 2011

(54) MEMORY ALLOCATION AND ACCESS METHOD AND DEVICE USING THE SAME

(75) Inventor: Cheok-Yan Goh, Hsinchu (TW)

(73) Assignee: Ralink Technology Corp., Jhubei, Hsinchu County (TW)

( * ) Notice: Subject to any disclaimer, the term of this patent is extended or adjusted under 35 U.S.C. 154(b) by 316 days.

(21) Appl. No.: 12/264,261

(22) Filed: Nov. 4, 2008

(65) Prior Publication Data
US 2009/0265526 A1    Oct. 22, 2009

(30) Foreign Application Priority Data
Apr. 21, 2008    (TW) ............... 97114474 A

(51) Int. Cl.
G06F 13/28    (2006.01)
(52) U.S. Cl. ............... 710/22; 710/12; 710/26; 710/28
(58) Field of Classification Search ............ None
See application file for complete search history.

(56) References Cited

U.S. PATENT DOCUMENTS 5,933,654 A * 8/1999 Galdun et al. ............ 710/23

* cited by examiner

Primary Examiner—Alan Chen
(74) Attorney, Agent, or Firm—Winston Hsu; Scott Margo

(57) ABSTRACT

A memory allocation method for a direct memory access controller (DMAC) in a limited-memory-size computer system includes the steps of allocating a memory space having continuous memory addresses to form a buffer of the DMAC; dividing the memory space successively into a plurality of first memory blocks and a second memory block, wherein the size of the second memory block is equal to a maximum frame size possibly accessed by the DMAC; and assigning the plurality of first memory blocks and the second memory block to a plurality of descriptors in order, wherein each of the plurality of descriptors is utilized for recording a memory address of a corresponding memory block as a pointers for the corresponding memory block.

14 Claims, 8 Drawing Sheets

MEMORY ALLOCATION AND ACCESS METHOD AND DEVICE USING THE SAME

BACKGROUND OF THE INVENTION

1. Field of the Invention

The present invention relates to a memory allocation and access method and related device, and more particularly, to a memory allocation and access method and related device that allocate a memory block with a size equal to a maximum possibly accessed data frame at the end of a continuous memory space to ensure that all received data frames can be stored into successive memory blocks.

2. Description of the Prior Art

In a computer system, a CPU (Central Processing Unit) is mainly used for "computing" data rather than "moving" data. Thus, from the perspective of the CPU, it is regarded as a waste of system resources to move data from a memory or other peripheral device through a data bus. In such situation, a DMA (Direct Memory Access) technique is used in the computer system to allow the peripheral device that needs high-speed data transfer with the memory, such as a graphics card, a network card, or a sound card, to move data directly from or into the memory without participation of the CPU. So, the CPU can be re-scheduled to handle other tasks, thereby enhancing system performance.

Please refer to FIG. 1. FIG. 1 is a schematic diagram of a conventional DMA device 10. The DMA device 10 includes a memory 110, a data bus 120 and a DMA controller (DMAC) 130. The memory 110 includes a first storage unit 112 and a second storage unit 114. The first storage unit 112 is utilized for storing data, and has a memory space that the computer system allocates to the DMA device 10. The memory space further includes memory blocks BLK_0-BLK_n. The second storage unit 114 is utilized for storing a descriptor table. The descriptor table includes descriptors DESC_0-DESC_n, of which each is utilized for recording a memory address and use status of a corresponding memory block to be a pointer of the corresponding memory block. The data bus 120 is coupled to the memory 110, the DMAC 130, a CPU 140 and a data source device 150, and is utilized for transferring control signals of the DMAC 130 and data being written into or read from the memory 110. The DMAC 130 is utilized for sending out a request signal REQ to the CPU 140 to request control of the data bus 120, and storing data of the data source device 150 into the memory blocks of the memory 110 according to memory allocation of the memory 110, i.e. a mapping relation between the descriptors and the memory blocks. Thus, when the data source device 150 is about to store data into the memory 110, the request signal REQ is firstly sent out to the CPU 140 to acquire the control of the data bus 120 by the DMAC 130. Then, the data can be stored into corresponding memory blocks by the DMAC 130 according to the memory allocation of the memory 110, and the use status of the memory 110 is recorded into the descriptor table as well.

However, for a limited-memory-size computer system, such as an embedded system, the memory that the system can provide for the DMAC 130 is limited. So in the memory 110, the size of the memory block assigned to each descriptor is generally smaller than that of a possibly received data frame, such that the received data frame is dispersed throughout multiple memory blocks. In this case, when the data source device 150 is about to store a data frame into the memory 110, the DMAC 130 then stores the data frame successively into memory blocks corresponding to a first unused descriptor and thereafter in the descriptor table according to the size of the data frame and use status of the descriptors DESC_0-DESC_n. For example, please refer to FIG. 2. FIG. 2 is a schematic diagram of a memory allocation of the memory 110 in FIG. 1. When a data frame FRAME_1 transmitted by the data source device 150 has a size that lies between two memory blocks and three memory blocks, and all of the descriptors DESC_0-DESC_n in the memory 110 are not used yet, the DMAC 130 stores the data frame FRAME_1 successively into the memory blocks BLK_0-BLK_2 corresponding to the descriptors DESC_0-DESC_2, and when a next data frame FRAME_2 is received, the DMAC 130 then stores the data frame FRAME_2 into corresponding memory blocks starting from the descriptor DESC_3. With such memory allocation, each data frame is dispersed throughout multiple memory blocks of the memory 110. Thus, when applications need a frame data stored in the memory 110, the CPU 140 has to collect data dispersed in the memory blocks according to relevant descriptors of the data frame and copy to a continuous memory space, so as to provide for the applications. Consequently, the CPU 140 still wastes computing resources on simple copy operations, causing inefficiency of the system performance.

In order to reduce the copy operations of the CPU 140 for enhancing system efficiency, another memory allocation manner is further provided in the prior art. Please refer to FIG. 3. FIG. 3 is a schematic diagram of another memory allocation of the memory 110 in FIG. 1. In FIG. 3, memory blocks BLK_0-BLK_n are successively mapped to descriptors DESC_0-DESC_n in like manner, and the difference with FIG. 2 is that the memory blocks BLK_0-BLK_n form a continuous memory space. In this case, a data frame can be stored into memory blocks with continuous memory space, and thus when the data frame is demanded by the applications, the continuous memory space occupied by the data frame can be directly provided to the applications by the CPU 140 according to relevant descriptors of the data frame, so that the data frame can be retrieved by the applications. Consequently, the CPU 140 no longer needs to perform the copy operations, and the system efficiency can be effectively enhanced. However, with this memory allocation manner, a received data frame may also be dispersed throughout inconsecutive memory blocks. For example, when the size of a data frame FRAME_3 lastly received by the DMAC 130 is greater than a total size of all unoccupied memory blocks in the memory 110, the data frame FRAME_3 is separately stored into inconsecutive memory blocks BLK_(n−1)-BLK_n and BLK_0-BLK_1, as shown in FIG. 3. At this time, the CPU 140 still has to copy the data frame FRAME_3 to a continuous memory space for the applications.

Certainly, the computer system can also allocate the size of a possibly received maximum data frame for each memory block in order to avoid the copy operations of the CPU completely. However, it is hard to implement in a limited-memory-size system, such as an embedded system, and thus more efficient design for allocating and using the memory is still needed.

SUMMARY OF THE INVENTION

It is therefore an objective of the present invention to provide a memory allocation and access method and related device.

According to the present invention, a memory allocation method for a direct memory access controller (DMAC) is disclosed. The method includes the steps of allocating a memory space having continuous memory addresses to form a buffer of the DMAC; dividing the memory space successively into a plurality of first memory blocks and a second memory block, wherein the size of the second memory block is equal to that of a maximum data frame possibly accessed by the DMAC; and assigning the plurality of first memory blocks and the second memory block to a plurality of descriptors in order, wherein each of the plurality of descriptors is utilized for recording a memory address of a corresponding memory block as a pointer for the corresponding memory block.

According to the present invention, a memory access method for a direct memory access controller (DMAC) is further disclosed. The method includes the steps of mapping a plurality of descriptors to a plurality of first memory blocks and a second memory block in order, wherein the plurality of first memory blocks and the second memory block have continuous memory addresses and a size of the second memory block is equal to that of a maximum data frame possibly accessed by the DMAC; receiving a first data frame and storing the first data frame successively into memory blocks of the plurality of first memory blocks and the second memory block corresponding to a first unused descriptor of a plurality of descriptors and thereafter according to a size of the first data frame and use status of the plurality of descriptors; determining whether a descriptor of the plurality of descriptors corresponding to the second memory block is used by the first data frame; and receiving and storing a second data frame when the descriptor corresponding to the second memory block is not yet used by the first data frame, wherein the second data frame is a next data frame of the first data frame.

According to the present invention, a direct memory access (DMA) device is further disclosed. The DMA device includes a memory, a data bus and a DMA controller (DMAC). The memory further includes a first storage unit and a second storage unit. The first storage unit has a memory space with continuous memory addresses. The memory space is successively divided into a plurality of first memory blocks and a second memory block, wherein a size of the second memory block is equal to that of a maximum data frame possibly accessed by the DMA device. The second storage unit is utilized for storing a descriptor table, which includes a plurality of descriptors successively corresponding to the plurality of first memory blocks and the second memory block, wherein each of the plurality of descriptors is utilized for recording a memory address of a corresponding memory block as a pointer for the corresponding memory block. The data bus is coupled to a data source device and the memory. The DMAC is coupled to the data bus, and is utilized for controlling data access of the data source device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
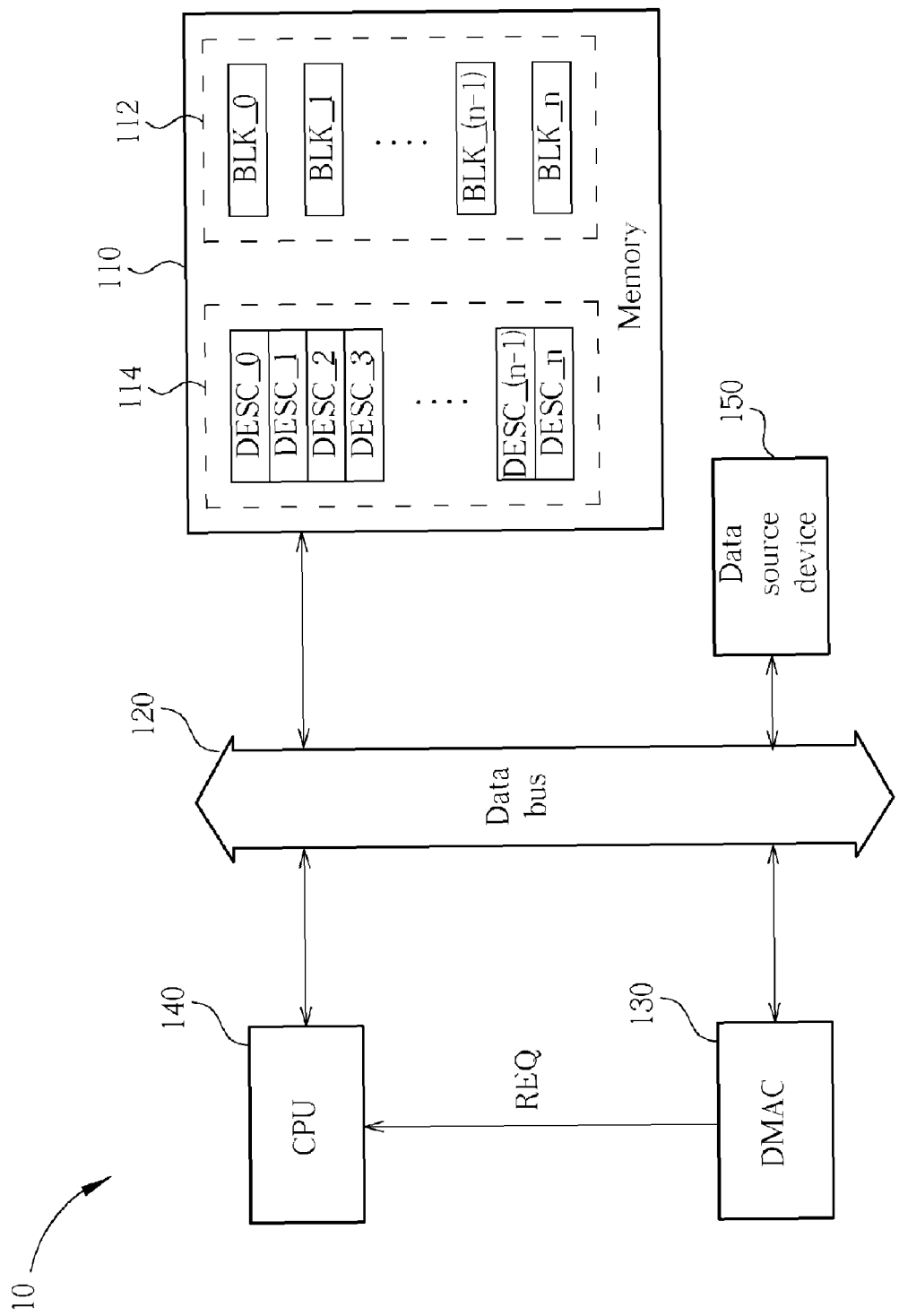
FIG. 1 is a schematic diagram of a conventional DMA device.
Figure 2:
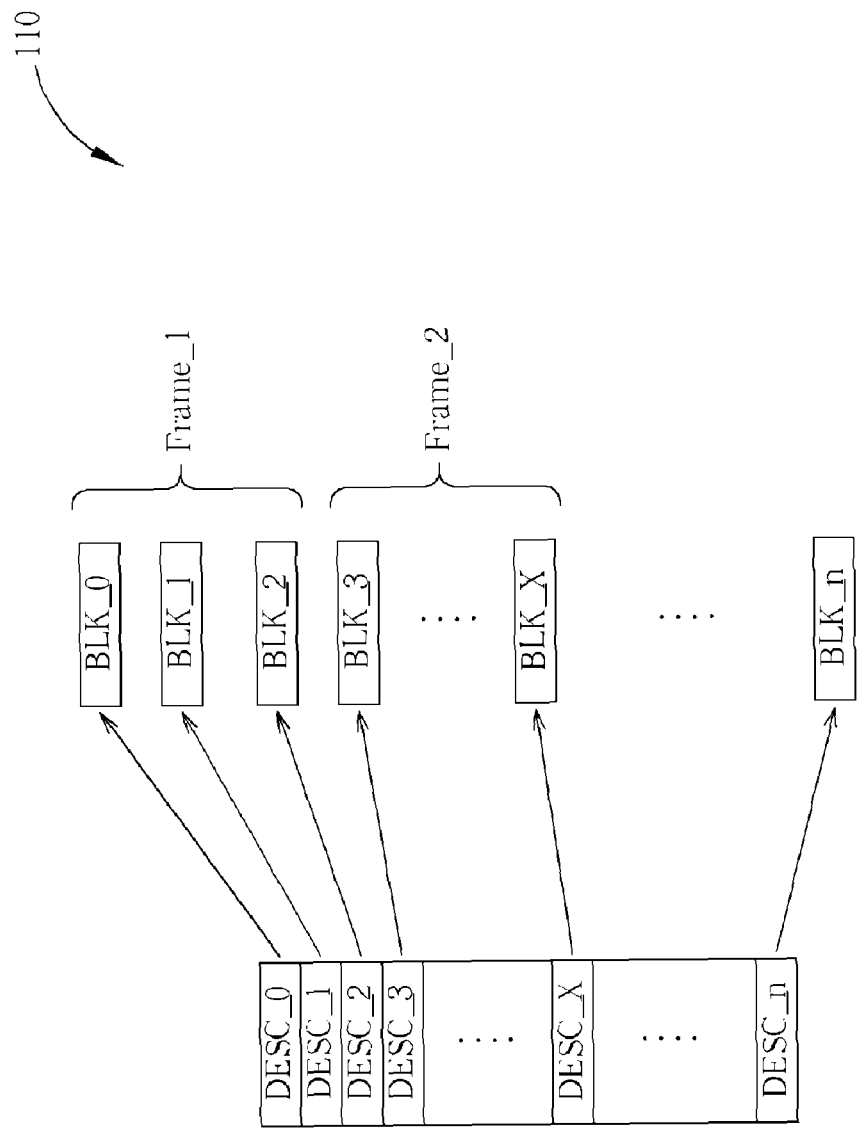
FIG. 2 is a schematic diagram of a memory allocation of the memory in FIG. 1.
Figure 3:
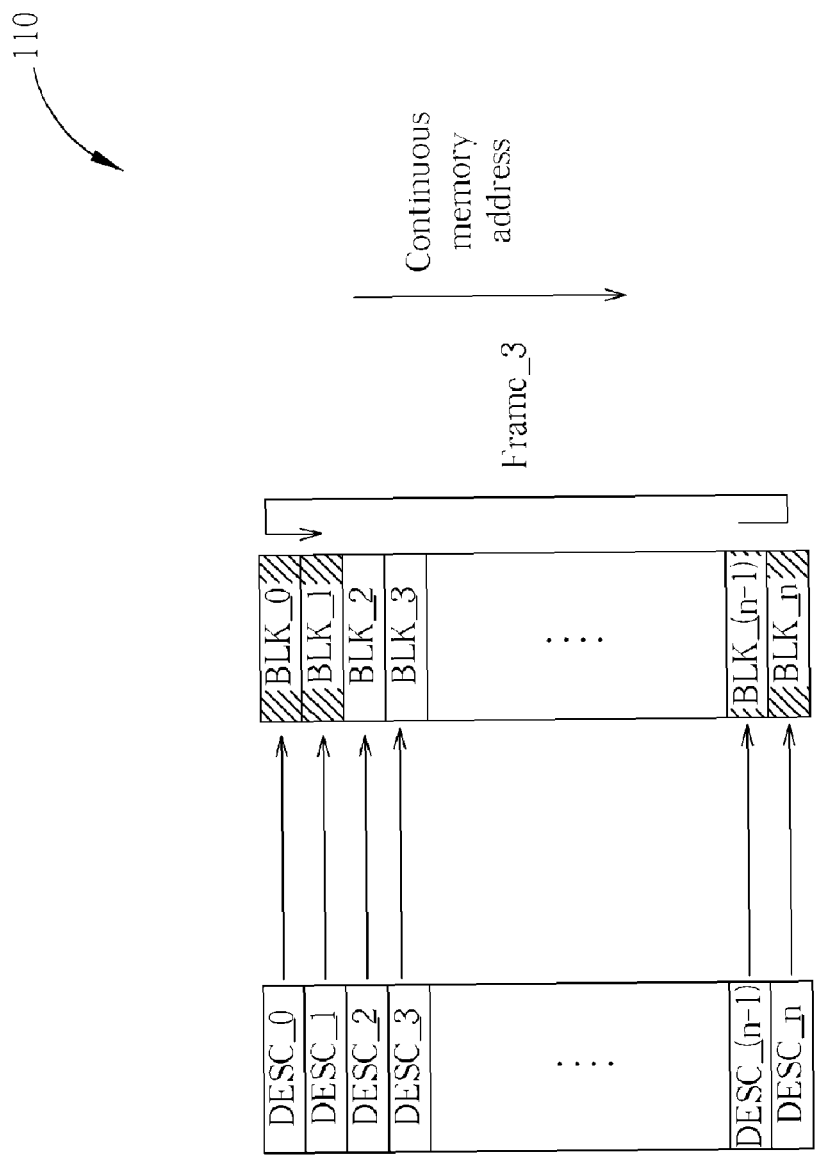
FIG. 3 is a schematic diagram of another memory allocation of the memory in FIG. 1.
Figure 4:
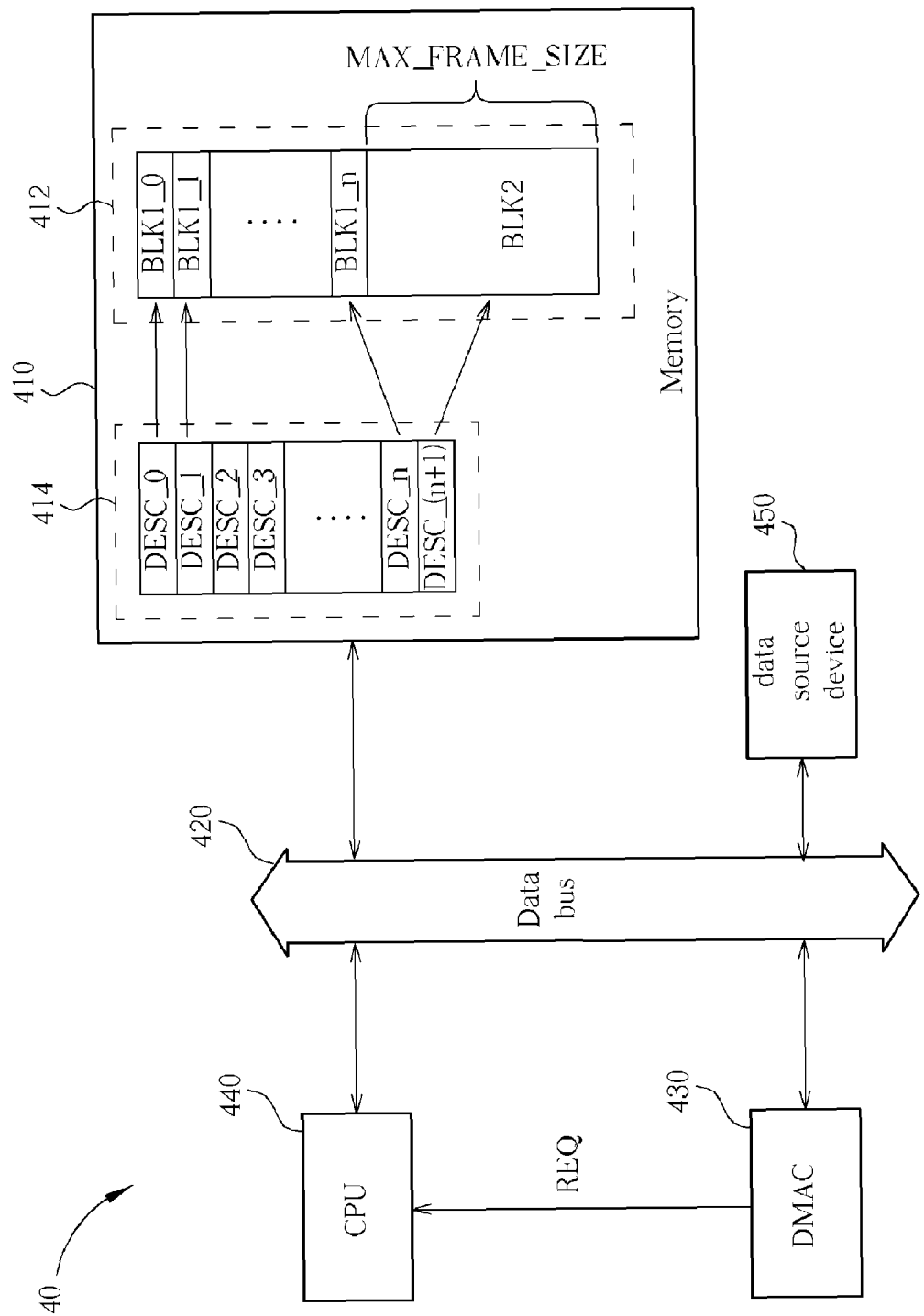
FIG. 4 is a schematic diagram of a DMA device utilized in a limited-memory-size system according to the present invention.

Please refer to FIG. 4. FIG. 4 is a schematic diagram of a DMA (direct memory access) device 40 utilized in a limited-memory-size system according to the present invention. The DMA device 40 includes a memory 410, a data bus 420 and a DMA controller (DMAC) 430. The memory 410 includes a first storage unit 412 and a second storage unit 414. The first storage unit 412 has a continuous memory space, which is successively divided into first memory blocks BLK1_0-BLK1_n and a second memory block BLK2, wherein a size of the second memory block BLK2 is equal to that of a maximum data frame MAX_FRAME_SIZE possibly accessed by the DMAC 430. The second storage unit 414 is utilized for storing a descriptor table, which further includes descriptors DESC_0-DESC_(n+1). Each descriptor corresponds to the first memory blocks BLK1_0-BLK1_n and the second memory block BLK2 in order, and is utilized for recording a memory address of a corresponding memory block to be a pointer of the memory block. The data bus 420 is coupled to the memory 410, the DMAC 430, a CPU 440 and a data source device 450, and is utilized for transferring control signals of the DMAC 430 and data being written into or read from the memory 410. The DMAC 430 is utilized for sending out a request signal REQ to the CPU 440 to request control of the data bus 420, and storing data of the data source device 450 into the memory 410 or reading data demanded by the data source device 450 from the memory 410 according to memory allocation of the memory 410. Note that the DMA device 40 is similar to the DMA device 10, and thus related operations are not narrated again herein. As for allocation and access methods of the memory 410, detailed descriptions are given in the following.

Figure 5:
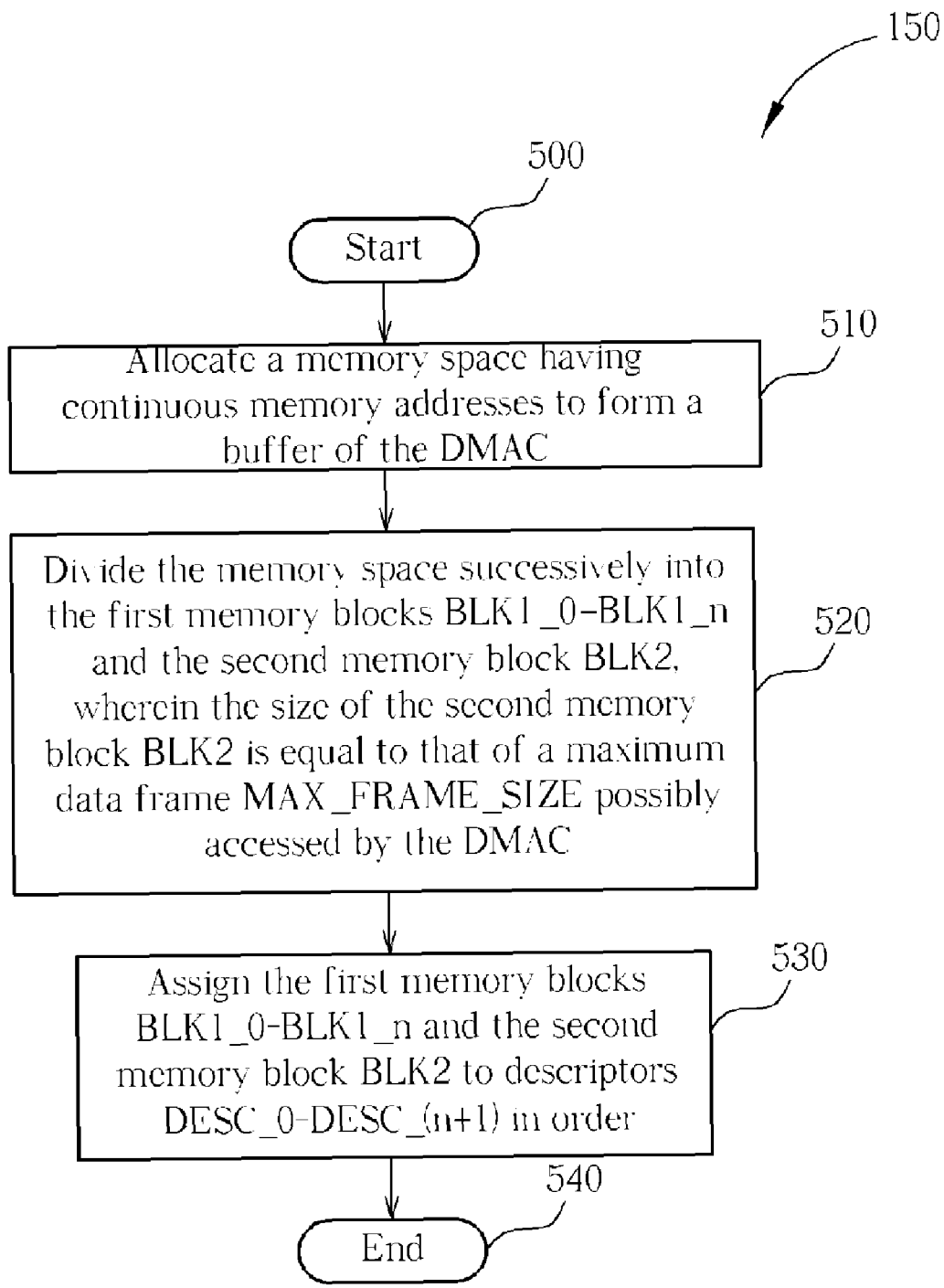
FIG. 5 is a schematic diagram of a memory allocation process according to an embodiment of the present invention.

Please refer to FIG. 5. FIG. 5 is a schematic diagram of a memory allocation process 50 according to an embodiment of the present invention. The memory allocation process 50 is utilized in the memory 410 of the DMA device 40, and includes the following steps:

Step 500: Start.

Step 510: Allocate a memory space having continuous memory addresses to form a buffer of the DMAC 430.

Step 520: Divide the memory space successively into the first memory blocks BLK1_0-BLK1_n and the second memory block BLK2, wherein the size of the second memory block BLK2 is equal to that of a maximum data frame MAX_FRAME_SIZE possibly accessed by the DMAC 430.

Step 530: Assign the first memory blocks BLK1_0-BLK1_n and the second memory block BLK2 to descriptors DESC_0-DESC_(n+1) in order.

Step 540: End.

According to the memory allocation process 50, the memory space having continuous memory addresses is firstly allocated in the memory 410 to form a buffer of the DMAC 430, i.e. the first storage unit 412. The memory space is successively divided into the first memory blocks BLK1_0-BLK1_n and the second memory block BLK2, wherein the size of the second memory block BLK2 is equal to that of a maximum data frame MAX_FRAME_SIZE possibly accessed by the DMAC 430. Then, the first memory blocks BLK1_0-BLK1_n and the second memory block BLK2 are mapped to the descriptors DESC_0-DESC_(n+1) in order for forming a descriptor table stored in the second storage unit 414. Thus, by the memory allocation process 50, when data of the data source device 450 is stored into the memory 410, the present invention can ensure that all received data frames can be stored into consecutive memory blocks. In other words, since the present invention allocates the second memory block BLK2 with the size equal to that of a possibly accessed maximum data frame MAX_FRAME_SIZE at the end of the continuous memory space, it is ensured that all received data frames can be stored into a continuous memory space even if a lastly received data frame is equal to the size of the maximum data frame MAX_FRAME_SIZE possibly received by the DMAC 430. Therefore, when frame data stored in the memory 410 is demanded by the applications, the CPU 440 can directly provide the frame data for the applications according to the memory address of the continuous memory space recorded in corresponding descriptors, and does not need to perform any copy operations, so that system efficiency can be effectively enhanced.

Preferably, in the present invention, the limited-memory-size system is an embedded system, and the size of the memory space occupied by the first storage unit 412 does not exceed twice the size of the possibly accessed maximum data frame MAX_FRAME_SIZE. Consequently, not only may a zero-copy DMA architecture be achieved in the present invention, but the use of memory may also be reduced significantly, which further saves production cost of the embedded system. In addition, for realizing the DMA function, the descriptors of the present invention can be further utilized for recording information such as use status of a corresponding memory block and whether data stored in the corresponding memory block is consecutive with a next memory block. Such variations also belong to the scope of the present invention.

Figure 6:
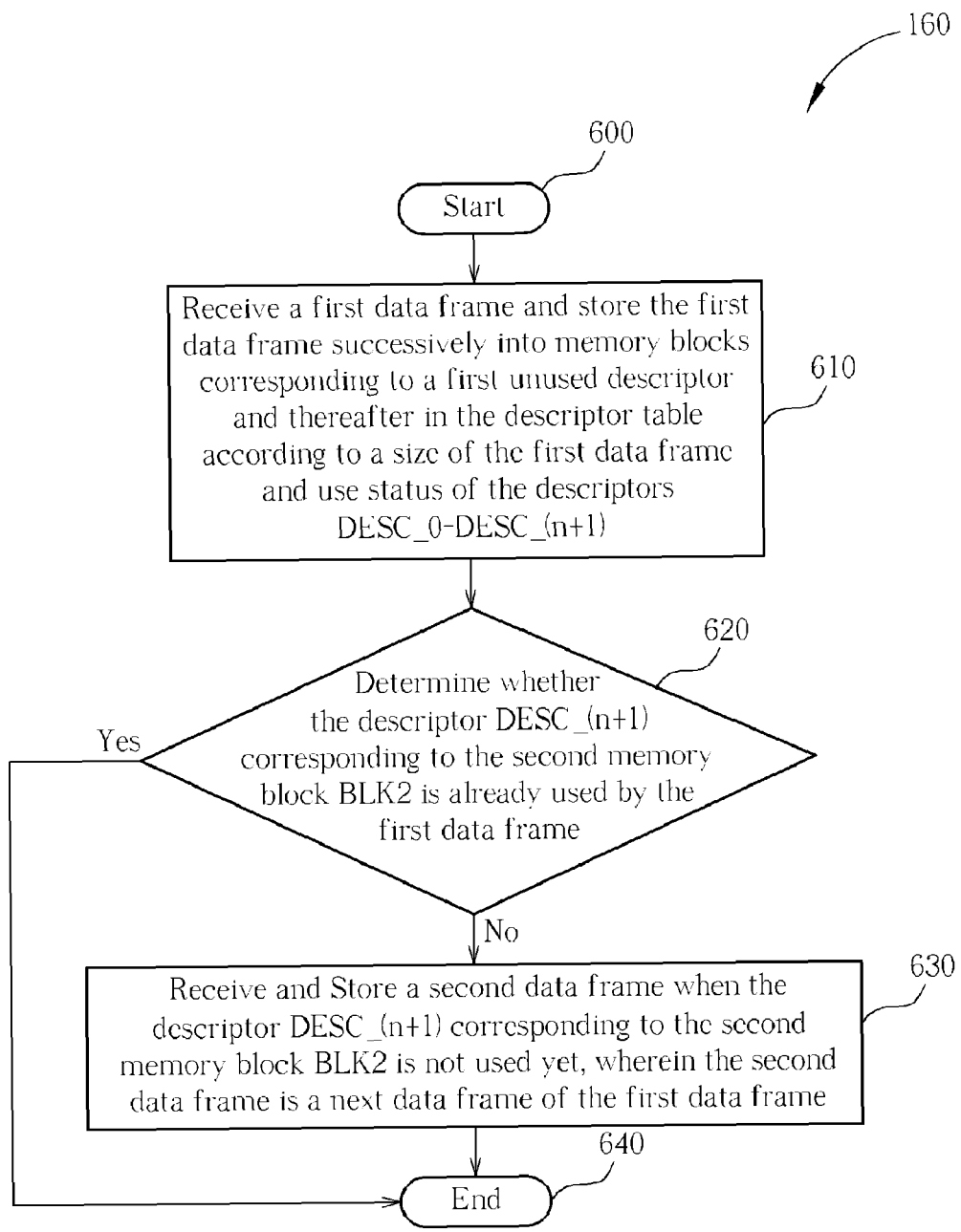
FIG. 6 is a schematic diagram of a memory access process according to an embodiment of the present invention.

For example, please refer to FIG. 6. FIG. 6 is a schematic diagram of a memory access process 60 according to an embodiment of the present invention. The memory access process 60 is utilized for accessing the memory 410 of the DMA device 40, and includes the following steps:

Step 600: Start.

Step 610: Receive a first data frame and store the first data frame successively into memory blocks corresponding to a first unused descriptor and thereafter in the descriptor table according to a size of the first data frame and use status of the descriptors DESC_0-DESC_(n+1).

Step 620: Determine whether the descriptor DESC_(n+1) corresponding to the second memory block BLK2 is already used by the first data frame. If so, proceed to Step 640; and if not, proceed to Step 630.

Step 630: Receive and Store a second data frame when the descriptor DESC_(n+1) corresponding to the second memory block BLK2 is not used yet, wherein the second data frame is a next data frame of the first data frame.

Step 640: End.

According to the memory access process 60, when a first data frame is received by the DMA device 40, the first data frame is successively stored into memory blocks corresponding to a first unused descriptor and thereafter in the descriptor table according to the size of the first data frame and the use status of the descriptors DESC_0-DESC_(n+1). Then, the DMA device 40 determines whether the descriptor DESC_(n+1) corresponding to the second memory block BLK2 is already used by the first data frame. If the descriptor DESC_(n+1) corresponding to the second memory block BLK2 is not used yet, the DMA device 40 can proceed to receive the second data frame, i.e. a next data frame of the first data frame, so as to store the second data frame into the memory 410. Conversely, if the second memory block BLK2 is already occupied by the first data frame, the second data frame cannot be received until the memory space of the first memory block BLK1_0 is released by the CPU 440, i.e. the descriptor DESC_0 is labeled as usable. Thus, as long as the second memory block BLK2 is not yet occupied by a last received data frame, a next data frame can be received and stored into the memory 410. Meanwhile, it is ensured that the next data frame can be stored in consecutive memory blocks.

Figure 7:
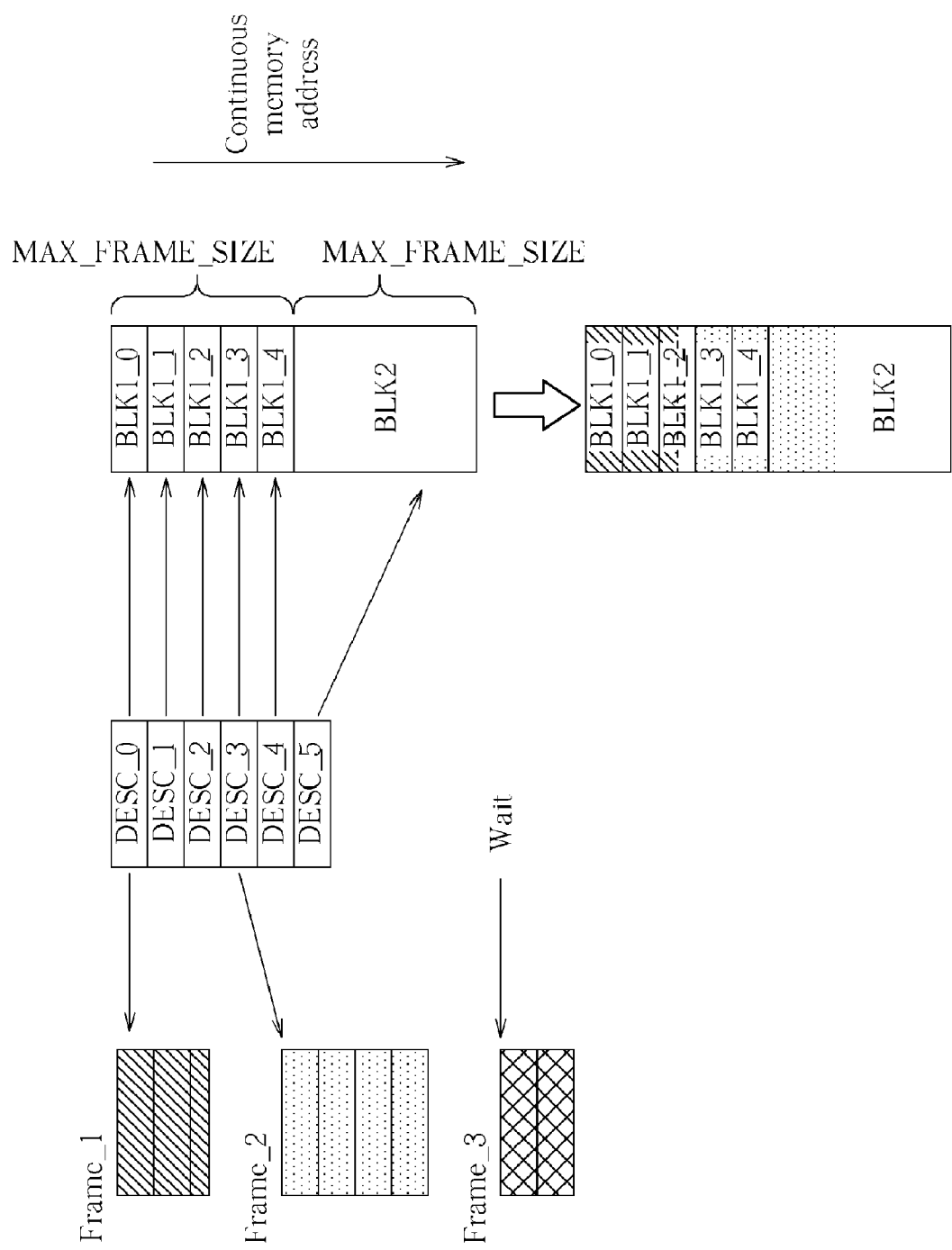
FIG. 7 is a schematic diagram of a first embodiment of the memory access process in FIG. 6.

To clarify the memory access process 60 further, please refer to FIG. 7, which is a schematic diagram of a first embodiment of the memory access process 60 of the present invention. In FIG. 7, the memory 410 includes descriptors DESC_0-DESC_5, which successively correspond to first memory blocks BLK1_0-BLK1_4 and a second memory block BLK2. A total size of the first memory blocks BLK1_0-BLK1_4 and a size of the second memory block BLK2 are both equal to the size of the maximum data frame MAX_FRAME_SIZE possibly accessed by the DMAC 430. As shown in FIG. 7, since the size of a data frame FRAME_1 lies between that of two and three first memory blocks, the data frame FRAME_1 is then stored into the first memory blocks BLK1_0-BLK1_2 corresponding to the descriptors DESC_0-DESC_2 by the DMAC 430. Then, the DMAC 430 determines that the descriptor DESC_5 corresponding to the second memory block BLK2 is not yet used by the data frame FRAME_1, and thus a next data frame FRAME_2 can further be received and stored into the first memory blocks BLK1_3-BLK1_4 and the second memory block BLK2 according to the size of the data frame FRAME_2. At this time, since the second memory block BLK2 is already occupied by the data frame FRAME_2, reception of a next data frame FRAME_3 would be stopped by the DMAC 430 until the memory space occupied by the data frame FRAME_1 is released by the CPU 440.

Figure 8:
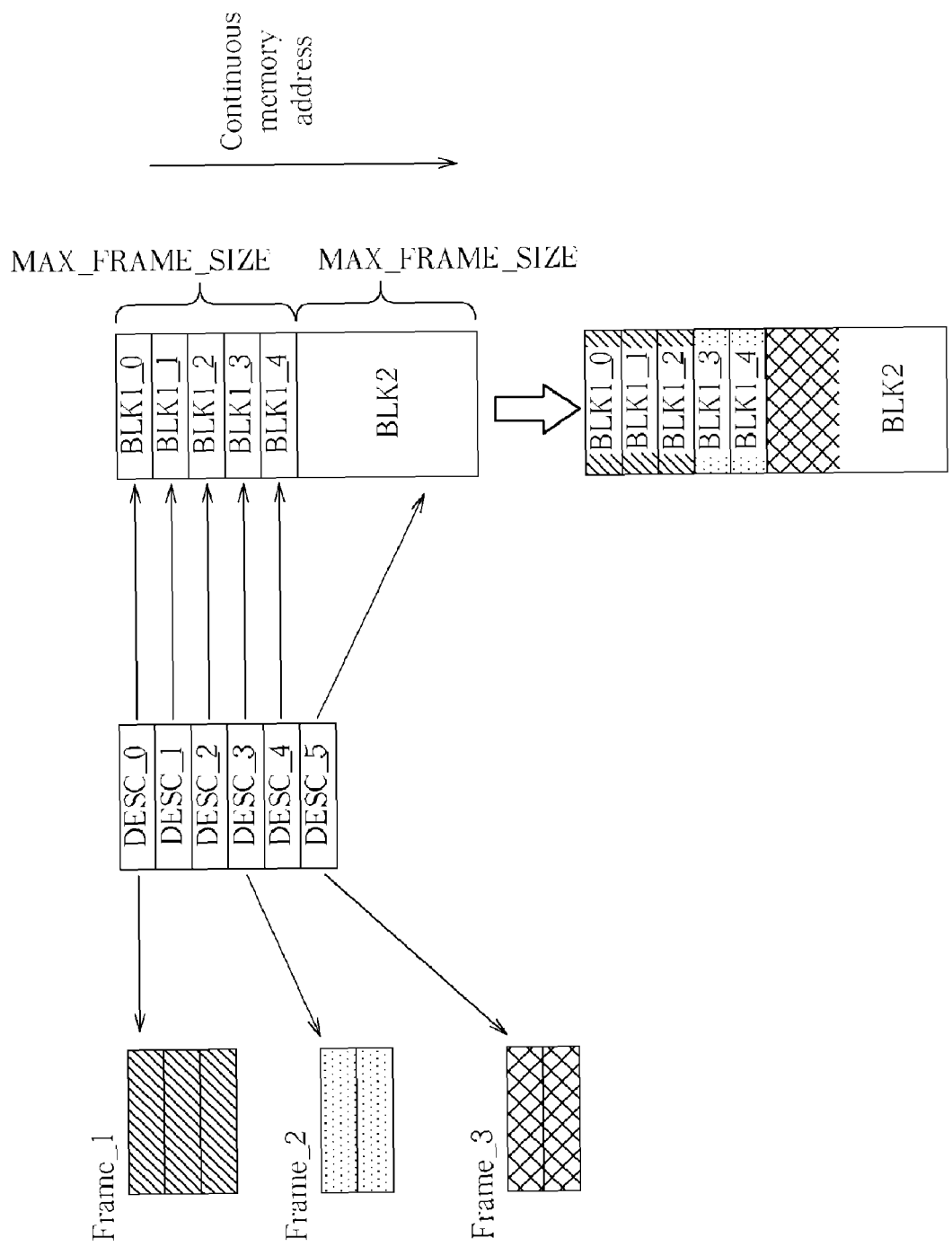
FIG. 8 is a schematic diagram of a second embodiment of the memory access process in FIG. 6.

Please refer to FIG. 8. FIG. 8 is a schematic diagram of a second embodiment of the memory access process 60 of the present invention. In FIG. 8, data frames FRAME_1 and FRAME_2 successively received by the DMAC 430 do not occupy the second memory block BLK2, and thus a next data frame FRAME_3 can further be received and stored into the second memory block BLK2 by the DMAC 430. In this case, even if the data frame FRAME_3 merely occupies a portion of the second memory BLK2, reception of the next data frame is still stopped by the DMAC 430 until the first memory block BLK1_0 is released by the CPU 440. Consequently, regardless of the size of data frames being received, it is ensured that all received data frames can be stored into consecutive memory blocks. Therefore, in the present invention, the CPU 440 does not need to perform any copy operations, and the frame data stored in the memory 410 can be directly provided to the applications according to the memory addresses of the consecutive memory blocks recorded in corresponding descriptors, so that the system efficiency can be enhanced effectively.

As mentioned above, the present invention allocates the memory block with the size equal to that of a possibly accessed maximum data frame at the end of the continuous memory space, and thus it is assured that all data frames received by the DMAC can be stored into a continuous memory space. Consequently, less memory can be used to achieve a zero-copy DMA architecture in the present invention, which not only enhances the system efficiency, but also saves the production cost of the embedded system.

Those skilled in the art will readily observe that numerous modifications and alterations of the device and method may be made while retaining the teachings of the invention.

What is claimed is:

1. A memory allocation method for a direct memory access controller (DMAC), the method comprising:
    allocating a memory space having continuous memory addresses to form a buffer of the DMAC;
    dividing the memory space successively into a plurality of first memory blocks and a second memory block, wherein the size of the second memory block is equal to that of a maximum data frame possibly accessed by the DMAC; and
    assigning the plurality of first memory blocks and the second memory block to a plurality of descriptors in order, wherein each of the plurality of descriptors is utilized for recording a memory address of a corresponding memory block as a pointer for the corresponding memory block.

2. The memory allocation method of claim 1, wherein the size of the memory space does not exceed twice the size of the maximum data frame.

3. The memory allocation method of claim 1, wherein the DMAC is utilized in a limited-memory-size system, the limited-memory-size system being an embedded system.

4. The memory allocation method of claim 1, wherein each of the plurality of descriptors is further utilized for recording use status of a corresponding memory block and whether data stored in the corresponding memory block is consecutive with a next memory block.

5. A memory access method for a direct memory access controller (DMAC) comprising:
    mapping a plurality of descriptors to a plurality of first memory blocks and a second memory block in order, wherein the plurality of first memory blocks and the second memory block have continuous memory addresses, and a size of the second memory block is equal to that of a maximum data frame possibly accessed by the DMAC;
    receiving a first data frame and storing the first data frame successively into memory blocks of the plurality of first memory blocks and the second memory block corresponding to a first unused descriptor of a plurality of descriptors and thereafter according to a size of the first data frame and use status of the plurality of descriptors;
    determining whether a descriptor of the plurality of descriptors corresponding to the second memory block is used by the first data frame; and
    receiving and storing a second data frame when the descriptor corresponding to the second memory block is not yet used by the first data frame, wherein the second data frame is a next data frame of the first data frame.

6. The memory access method of claim 5, wherein receiving the first data frame and storing the first data frame successively into memory blocks of the plurality of first memory blocks and the second memory block corresponding to the first unused descriptor of the plurality of descriptors and thereafter according to the size of the first data frame and the using status of the plurality of descriptors comprises:
    storing the first data frame into a memory block of the plurality of first memory blocks and the second memory block corresponding to the first unused descriptor of the plurality of descriptors when the size of the first data frame is smaller than that of the first memory block.

7. The memory access method of claim 5 further comprising:
    stopping receiving the second data frame when the second memory block is already used by the first data frame until a first descriptor of the plurality of descriptors is determined usable.

8. The memory access method of claim 5, wherein a total size of the plurality of first memory blocks and the second memory block does not exceed twice the size of the maximum data frame.

9. The memory access method of claim 5, wherein the DMAC is utilized in a limited-memory-size system, the limited-memory-size system being an embedded system.

10. The memory access method of claim 5, wherein each of the plurality of descriptors is utilized for recording a memory address of a corresponding memory block, use status of the corresponding memory block and whether data stored in the corresponding memory block is consecutive with a next memory block.

11. A direct memory access (DMA) device comprising:
    a memory comprising:
        a first storage unit having a memory space with continuous memory addresses, the memory space being successively divided into a plurality of first memory blocks and a second memory block, wherein a size of the second memory block is equal to that of a maximum data frame possibly accessed by the DMA device; and
        a second storage unit for storing a descriptor table, the descriptor table comprising a plurality of descriptors successively corresponding to the plurality of first memory blocks and the second memory block, wherein each of the plurality of descriptors is utilized for recording a memory address of a corresponding memory block as a pointer for the corresponding memory block;
    a data bus, coupled to a data source device and the memory; and
    a DMA controller (DMAC), coupled to the data bus, for controlling data access of the data source device.

12. The DMA device of claim 11, wherein a size of the memory space does not exceed twice the size of the maximum data frame.

13. The DMA device of claim 11, wherein the DMA device is utilized in a limited-memory-size system, the limited-memory-size system being an embedded system.

14. The DMA device of claim 11, wherein each of the plurality of descriptors is further utilized for recording using status of a corresponding memory block and whether data stored in the corresponding memory block is consecutive with a next memory block.

* * * * *